May 5, 1953
B. SAKREN
2,637,097
REMOVABLE TOOTH FILE
Filed Nov. 16, 1949
3 Sheets-Sheet 1
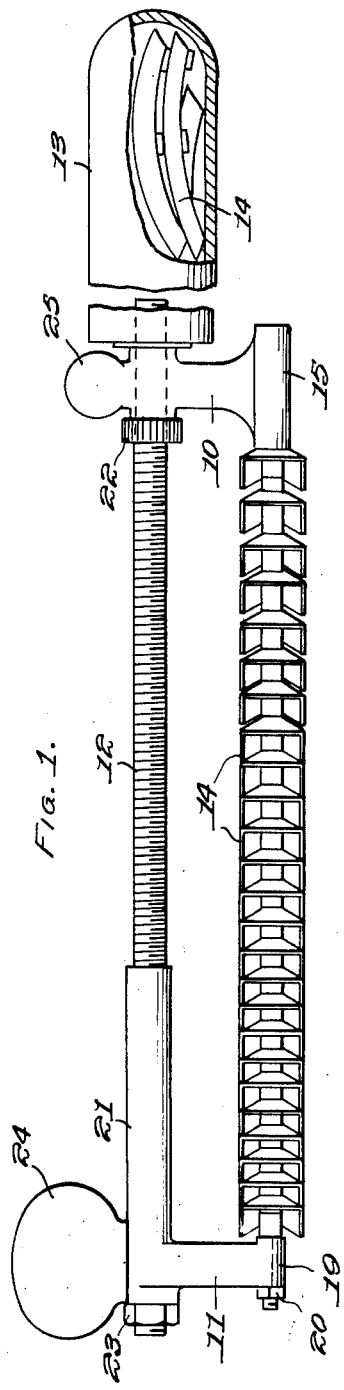
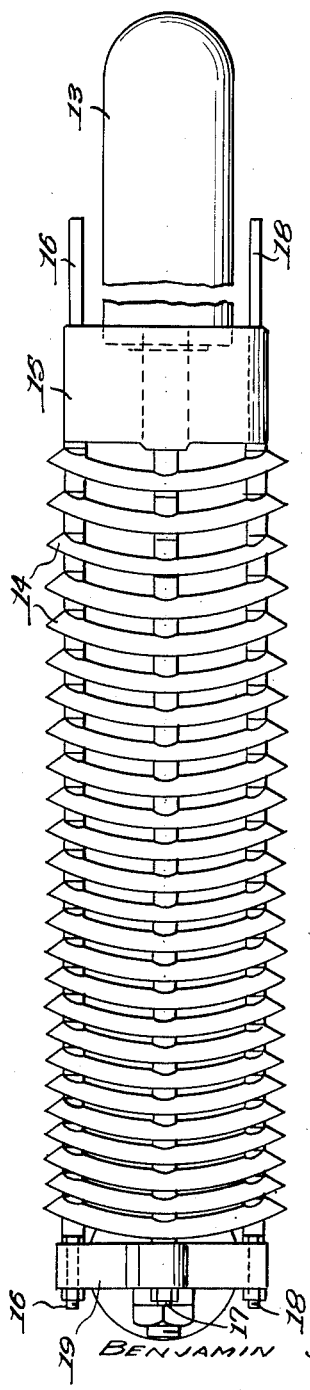
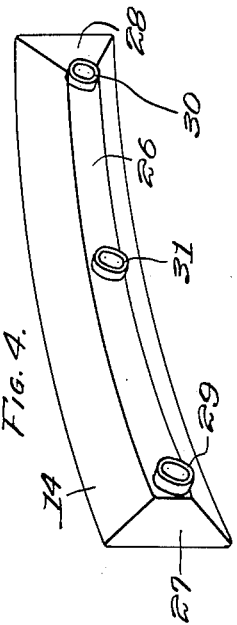
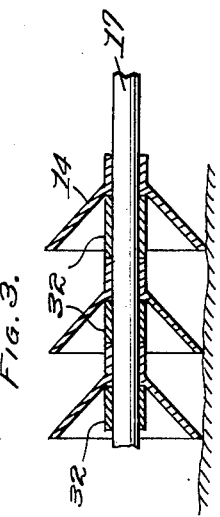
INVENTOR.
BENJAMIN SAKREN;
BY *Victor J. Evans & Co.*
ATTORNEYS May 5, 1953  B. SAKREN  2,637,097
REMOVABLE TOOTH FILE
Filed Nov. 16, 1949  3 Sheets-Sheet 2
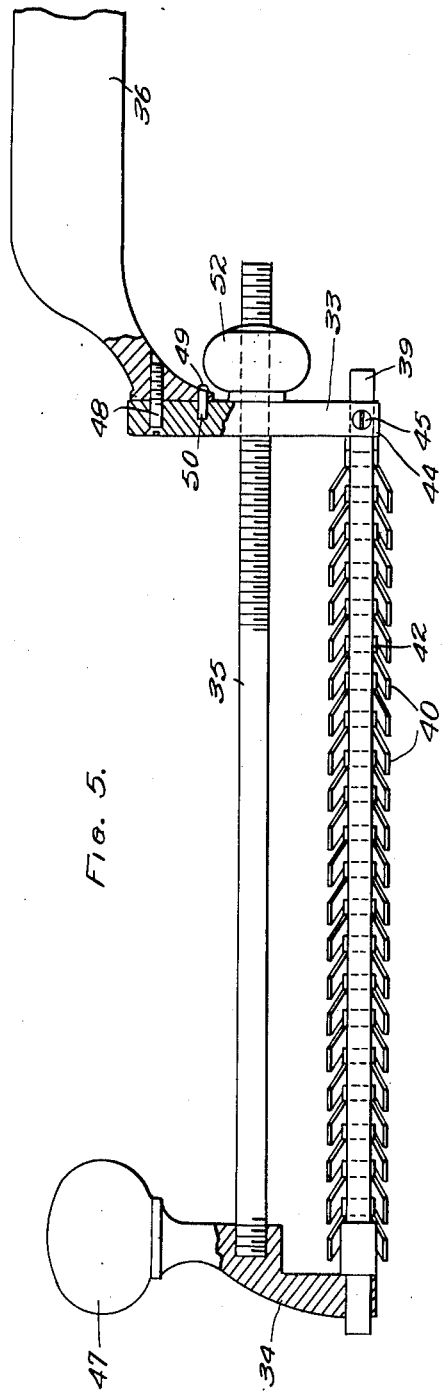
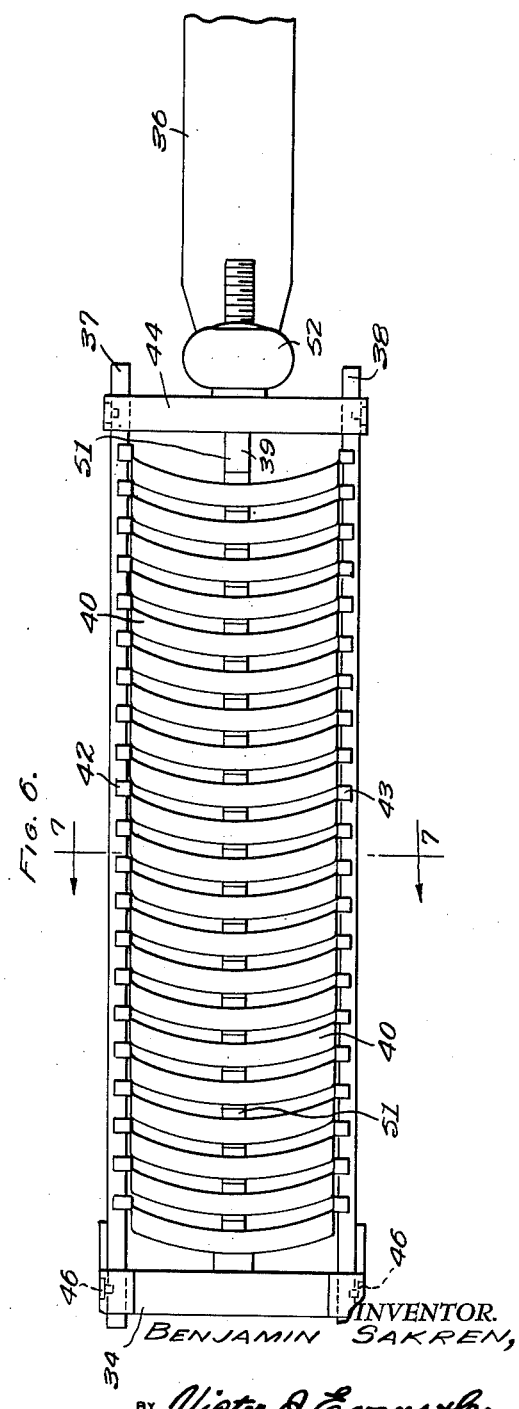
INVENTOR.
BENJAMIN SAKREN,
BY Victor J. Evans & Co.
ATTORNEYS.

May 5, 1953 B. SAKREN 2,637,097
REMOVABLE TOOTH FILE
Filed Nov. 16, 1949 3 Sheets-Sheet 3
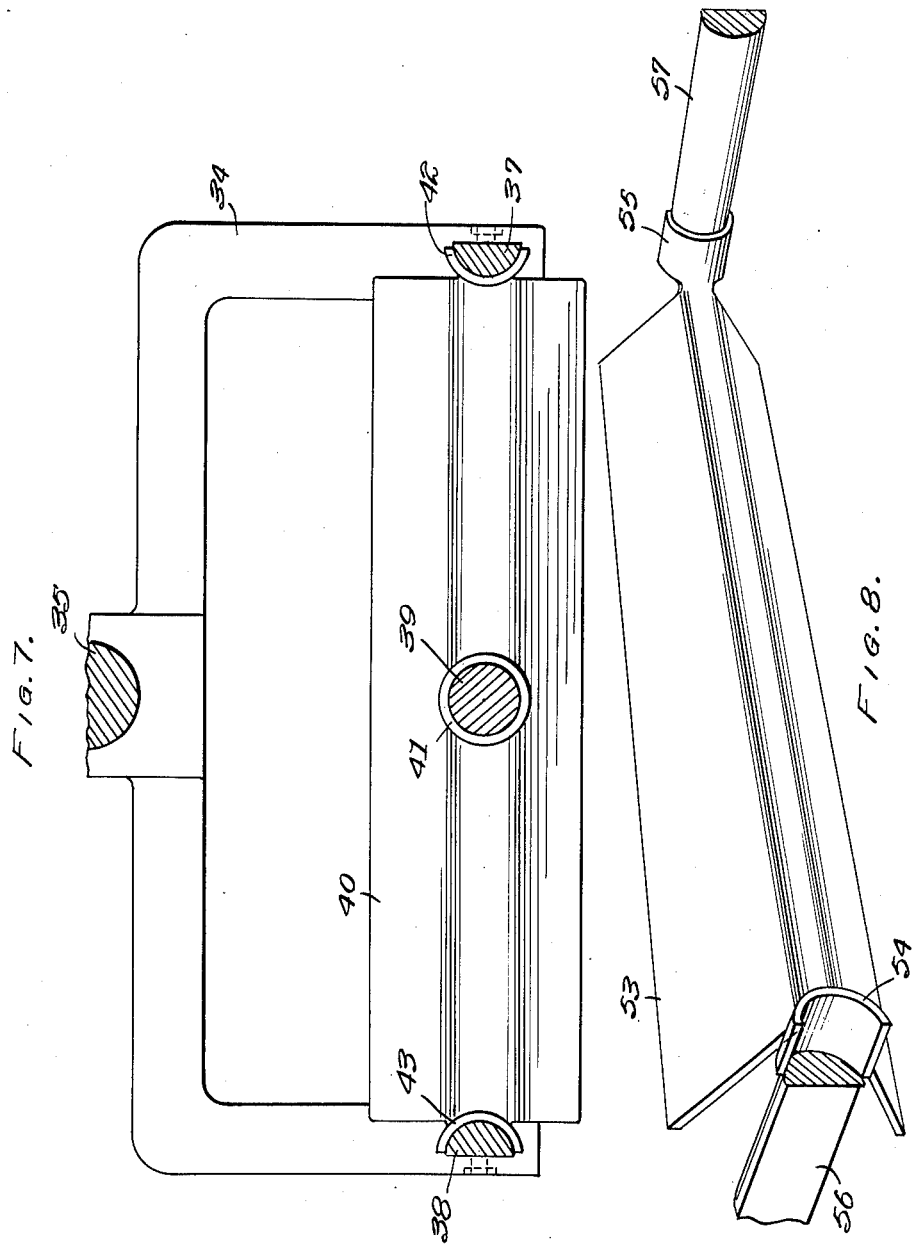
INVENTOR.
BENJAMIN SAKREN
BY Victor J. Evans & Co.
ATTORNEYS Patented May 5, 1953

2,637,097

UNITED STATES PATENT OFFICE 2,637,097

REMOVABLE TOOTH FILE

Benjamin Sakren, Miami, Fla.

Application November 16, 1949, Serial No. 127,701

2 Claims. (Cl. 29—79)

This invention relates to files of the removable or reversible tooth type wherein a plurality of teeth or cutters are assembled for filing action in a frame, and in particular a plurality of cutting elements clamped in a frame with cutting edges thereof in a common plane and in which the cutting elements or teeth are supported at the ends and also at points intermediate of the ends and the teeth are arranged whereby the teeth at one end are substantially close together whereas the teeth at the opposite end are separated by comparatively wide spaces.

The purpose of this invention is to provide improvements in a rasp or file of this type whereby comparatively thin cutting elements may be used and in which the cutting elements are rigidly supported throughout the length thereof.

This invention is an improvement over the file of my prior Patent No. 2,161,532 of June 6, 1939, wherein instead of using comparatively heavy cast cutting elements, thin stamped elements are used and this is made possible by supporting the elements at the center.

In a usual type of file or rasp of this type transversely disposed cutters are rigidly clamped between mounting elements and because of the rigidity desired it is difficult to provide escape passage ways for filings, shavings and the like. With this thought in mind this invention contemplates an improved type of cutter or tooth and a rigid supporting frame wherein the teeth are positively clamped in operative positions with open escape passage ways between the teeth.

The object of this invention is, therefore, to provide means for forming cutting teeth of rasps or files therein the webs on which the cutting edges are formed are diagonally positioned, providing bracing means and the supporting elements of the cutters are not only positioned at the ends but at points intermediate of the ends whereby all springy action of the cutters or teeth is substantially eliminated.

Another object of the invention is to provide an improved type of tooth or cutter for files or rasps having removable teeth wherein the teeth may readily be removed, the position thereof reversed, and the teeth replaced.

A further object of the invention is to provide a rasp type of file having reinforced removable teeth which is of a simple and economical construction.

With these and other objects and advantages in view the invention embodies a file comprising a head and a bracket spaced from the head and connected thereto by a plurality of spaced parallel bars with a handle extended from the head and with a plurality of teeth or cutters clamped on bars extended between the head and bracket.

Other features and advantages of the invention will appear from the following description taken in connection with the drawings wherein:

Figure 1 is a view showing a side elevation of the file with parts of the handle broken away, and illustrating the storage chamber for cutters of the file in the handle.

Figure 2 is a view looking upwardly toward the lower surface of the file.

Figure 3 is a detail showing a longitudinal section through one of the side bars of the file illustrating the mounting of the teeth and spacers on the bar.

Figure 4 is a detail illustrating a rear view of one of the cutters or teeth.

Figure 5 is a longitudinal section through the center of the file with parts broken away and parts shown in elevation, and illustrating a modification wherein a frame of a different type is used.

Figure 6 is a view looking upwardly toward the under side of the file illustrated in Figure 5.

Figure 7 is a cross section through the file shown in Figure 6 taken on line 7—7 thereof.

Figure 8 is a detail showing a similar view illustrating the mounting of the teeth or cutters of the file shown in Figure 5, and showing a modification wherein the cutter blades are straight and the center bar is omitted.

Referring now to the drawings wherein like reference characters denote corresponding parts the improved removable tooth file of this invention includes a frame having a head 10, a bracket 11, a connecting and adjusting screw 12, a handle 13, and a plurality of cutters or teeth 14.

The head 10 is provided with a base 15 in which parallel rods 16, 17 and 18 are mounted and the outer ends of the rods are mounted in a base 19 of the bracket 11 in which they are clamped by nuts 20.

The bracket 11 is provided with a forwardly extended sleeve 21 through which the screw 12 extends and with one end of the screw clamped in the head 10 by the handle 13 and a nut 22, the opposite end is secured in the bracket by a nut 23, thereby positively clamping the elements together. The bracket 11 is provided with a knob 24 and a head 10 is formed with a similar knob 25 whereby with the handle 13 gripped in one hand with the thumb of the hand on the knob 25 the knob 24 is gripped by the other hand so that the device may be used for cutting or filing in the usual manner.

The cutters 14 are formed as illustrated in Figures 3 and 4 with the diagonally disposed webs thereof connected by a vertical web 26 and end webs 27 and 28. The web 26 is provided with hubs 29 and 30 at the ends and a similar hub 31 is positioned at the center. The cutters are positioned over the rods 16, 17 and 18 with the rods extended through the hubs and with spacing elements 32 positioned between the teeth or cutters the cutters may be positively clamped between the head and bracket by the screw 12.

In the design shown in Figures 2 and 3 the spacers 32 are longer at the inner end of the file whereby the teeth are positioned relatively close on the outer end of the file and separated by open spaces on the inner end. It will be understood that the spacers 32 may be of any suitable length and the length of the spacers may be varied throughout the length of the file.

The handle 13, as illustrated in Figure 1 is hollow and teeth or cutters 14 may be stored therein so that as the edge of a tooth is nicked or broken the tooth may readily be removed and replaced, or as both sides of the teeth are similar the positions of the teeth on the bars may be reversed to provide a fresh cutting edge on the lower surface of the file.

In the design illustrated in Figures 5 to 8 the file is formed with a head 33, a bracket 34, a clamping and adjusting screw 35, a handle 36, side bars 37 and 38 and a center bar 39.

In this design cutters 40, similar to the cutters or teeth 14 are positioned on the bars 37, 38 and 39 with hubs 41, in the centers of the cutters positioned on the rod 39 and with semi-circular shoes 42 and 43, provided at the end to receive the bars 37 and 38.

The bars 37 and 38 are secured in the base 44 of the head 33 by screws 45 and the outer ends of the rods are secured in the brackets 34 by screws 46.

In the design shown in Figures 5 and 6 the bracket 34 is provided with a knob 47, and the handle 36 is attached to the upper end of the head 33 by a screw 48 with a pin 49 on the handle extended into a socket 50 in the head to hold the handle in position.

In this design the teeth or cutters 40 are mounted on the rod 39 with spacing elements 51 between the teeth and with the shoes 42 and 43 providing stabilizing means at the ends of the teeth. The parts are clamped in this position by the thumb nut 52 on the screw 35.

In the design shown in figure 8 the cutter blades 53 with semi-circular shoes 54 and 55 on the ends thereof are clamped between rods 56 and 57. In this design the cutter blades are straight and the center bar is omitted, whereby the blades are held only at the ends by the shoes and the shoes may be welded or secured to the rods by any suitable means.

With the parts arranged in this manner the teeth of cutting ridges of a file are mounted on or clamped between rods and with the file held by the handle at one end and the knob it may be used, particularly as a rasp, with the filings or shavings escaping through the channels between the cutters or teeth.

Forming the cutters on the edges of diagonally positioned webs, particularly as illustrated in Figures 3 and 4 stiffens the teeth making it possible to stamp the teeth of a file from sheet material and this makes it possible to reduce the weight to such an extent that the weight of the assembled structure is not objectionable. As the edges of the teeth or cutters wear the cutters may be removed, turned over and replaced, or the cutters may be replaced by new units.

It will be understood that other modifications may be made in the design and arrangement of the parts without departing from the spirit of the invention.

What is claimed is:

1. In a removable tooth file, the combination which comprises a head having a handle extended therefrom, side bars mounted in the head and extended therefrom, a centrally disposed bar also mounted in the head and extended therefrom and positioned in a plane extended through the side bars, a bracket positioned on the outer ends of the bars, a removable adjusting screw extended through the head and bracket having clamping means thereon, a plurality of cup shaped cutting elements having diagonally disposed sides and ends with hubs on the backs thereof positioned on the bars with the bars extended through hubs at the ends and also through a hub in the center of each of the cutters, and spacing elements positioned on the rods between the cutters.

2. In a removable tooth file, the combination which comprises a head having a handle extended therefrom, side bars mounted in the head and extended therefrom, a centrally disposed bar also mounted in the head and extended therefrom and positioned in a plane extended through the side bars, a bracket positioned on the outer ends of the bars, a removable adjusting screw extended through the head and bracket having clamping means thereon, a plurality of cup shaped cutting elements having diagonally disposed sides and ends with hubs on the backs thereof positioned on the bars with the bars extended through hubs at the ends and also through a hub in the center of each of the cutters, and spacers of different lengths positioned on the rods between the cutters.

BENJAMIN SAKREN.

References Cited in the file of this patent

UNITED STATES PATENTS

| Number | Name | Date |
|---|---|---|
| 228,975 | Borland | June 22, 1880 |
| 324,912 | Anthony | Aug. 25, 1885 |
| 570,511 | Shaw | Nov. 3, 1896 |
| 2,161,532 | Sakren et al. | June 6, 1939 |

FOREIGN PATENTS

| Number | Country | Date |
|---|---|---|
| 49,112 | Sweden | May 4, 1921 |
| 547,029 | France | Nov. 29, 1922 |